（12) United States Patent
Barrett

(10) Patent No.: US 10,717,116 B2
(45) Date of Patent: Jul. 21, 2020

(54) METHOD OF SLURRY INFILTRATION AND CLEANING TO FABRICATE A CERAMIC MATRIX COMPOSITE (CMC) COMPONENT WITH AN INTERNAL CAVITY OR BORE

(71) Applicant: Rolls-Royce High Temperature Composites Inc., Cypress, CA (US)

(72) Inventor: Christopher Barrett, Huntington Beach, CA (US)

(73) Assignee: ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 80 days.

(21) Appl. No.: 15/967,005

(22) Filed: Apr. 30, 2018

(65) Prior Publication Data

US 2018/0311708 A1 Nov. 1, 2018

Related U.S. Application Data

(60) Provisional application No. 62/492,484, filed on May 1, 2017.

(51) Int. Cl.
*C04B 35/565* (2006.01)
*C04B 35/573* (2006.01)
(Continued)

(52) U.S. Cl.
CPC .............. *B08B 9/04* (2013.01); *C04B 35/565* (2013.01); *C04B 35/573* (2013.01);
(Continued)

(58) Field of Classification Search
CPC ............... B08B 9/04; C04B 35/62868; C04B 35/62873
See application file for complete search history.

(56) References Cited

U.S. PATENT DOCUMENTS 4,713,877 A * 12/1987 Abbott ................ C04B 35/2683
29/596
5,260,125 A * 11/1993 Copes ..................... C04B 35/18
428/408

(Continued)

OTHER PUBLICATIONS

Substechs.com Archived URL: (https://web.archive.org/web/20120514101414/https://www.substech.com/dokuwiki/doku.php?id=boron_nitride_as_solid_lubricant, (2012) (Year: 2012).*

*Primary Examiner* — Alison L Hindenlang
*Assistant Examiner* — Andrés E. Behrens, Jr.
(74) *Attorney, Agent, or Firm* — Brinks Gilson & Lione

(57) ABSTRACT

A method of slurry infiltration and cleaning to fabricate a ceramic matrix composite (CMC) component with an internal cavity or bore comprises inserting a number of rods into a hollow portion of a porous fiber preform, thereby forming a rod arrangement substantially filling the hollow portion. Each of the rods has a low-friction surface comprising a coefficient of static friction of about 0.1 or less. The porous fiber preform is exposed to a slurry comprising particulate solids in a liquid carrier, and the slurry infiltrates the porous fiber preform. Some fraction of the particulate solids is deposited within interstices of the porous fiber preform to form an impregnated fiber preform, and another fraction of the particulate solids is deposited within the hollow portion as excess slurry. After slurry infiltration, the rods are withdrawn from the hollow portion, and at least some of the excess slurry is removed with the rods.

20 Claims, 1 Drawing Sheet

(51) Int. Cl.
*B08B 9/04* (2006.01)
*C04B 35/80* (2006.01)
*C04B 35/628* (2006.01)
*C04B 35/00* (2006.01)

(52) U.S. Cl.
CPC .. *C04B 35/62868* (2013.01); *C04B 35/62873*
(2013.01); *C04B 35/806* (2013.01); *C04B*
*2235/3826* (2013.01); *C04B 2235/524*
(2013.01); *C04B 2235/5224* (2013.01); *C04B*
*2235/5228* (2013.01); *C04B 2235/5244*
(2013.01); *C04B 2235/5248* (2013.01); *C04B*
*2235/6028* (2013.01); *C04B 2235/616*
(2013.01); *F05D 2300/6033* (2013.01)

(56) References Cited

U.S. PATENT DOCUMENTS

| | | | | |
|---|---|---|---|---|
| 6,503,441 | B2 * | 1/2003 | Corman | B32B 18/00 |
| | | | | 264/29.1 |
| 7,632,434 | B2 * | 12/2009 | Duescher | C09K 3/1436 |
| | | | | 264/11 |
| 8,755,658 | B2 * | 6/2014 | Proulx | G02B 6/02347 |
| | | | | 385/125 |
| 9,249,669 | B2 | 2/2016 | Garcia-Crespo et al. | |
| 9,364,360 | B2 * | 6/2016 | Shannon | B32B 38/06 |
| 9,452,548 | B2 * | 9/2016 | Finnerty | B28B 7/30 |
| 2003/0146346 | A1 * | 8/2003 | Chapman, Jr. | B64F 5/10 |
| | | | | 244/123.3 |

* cited by examiner

METHOD OF SLURRY INFILTRATION AND CLEANING TO FABRICATE A CERAMIC MATRIX COMPOSITE (CMC) COMPONENT WITH AN INTERNAL CAVITY OR BORE

RELATED APPLICATION

The present patent document claims the benefit of priority to U.S. Provisional Patent Application Ser. No. 62/492,484, which was filed on May 1, 2017, and is hereby incorporated by reference in its entirety.

TECHNICAL FIELD

The present disclosure is directed generally to the fabrication of ceramic matrix composites (CMCs) and more particularly to the slurry infiltration process.

BACKGROUND

Ceramic matrix composites (CMCs), which include ceramic fibers embedded in a ceramic matrix, exhibit a combination of properties that make them promising candidates for industrial applications that demand excellent thermal and mechanical properties along with low weight, such as gas turbine engine components.

CMC component manufacturing typically includes a slurry infiltration step that may entail submerging a porous fiber preform in a slurry formulation to promote infiltration. Slurry infiltration may occur through surfaces of the preform exposed to the slurry formulation. Once infiltration is complete, any excess slurry may be removed from the surfaces by cleaning. Removal of excess slurry from an internal cavity or bore, however, where the slurry formulation may accumulate and cure to a consistency similar to dried clay, can be challenging and time-consuming.

BRIEF SUMMARY

An improved method of slurry infiltration and cleaning to fabricate a CMC component with an internal cavity or bore is described herein.

The method comprises inserting a number of rods into a hollow portion of a porous fiber preform to form a rod arrangement substantially filling the hollow portion. Each of the rods has a low-friction surface comprising a coefficient of static friction of about 0.1 or less. The porous fiber preform is exposed to a slurry comprising particulate solids in a liquid carrier, and the slurry infiltrates the porous fiber preform. Some fraction of the particulate solids is deposited within interstices of the porous fiber preform to form an impregnated fiber preform, and another fraction of the particulate solids is deposited within the hollow portion as excess slurry. After slurry infiltration, the rods are withdrawn from the hollow portion, and at least some of the excess slurry is removed with the rods.

DETAILED DESCRIPTION

A new method of slurry infiltration and cleaning to fabricate a CMC component with an internal cavity or bore has been developed. The new method, which utilizes a CMC preform comprising a hollow portion, may be effective not only in removing excess slurry from the hollow portion after slurry infiltration, but also in reducing the amount of slurry that accumulates in the hollow portion in the first place.

Figure 1:
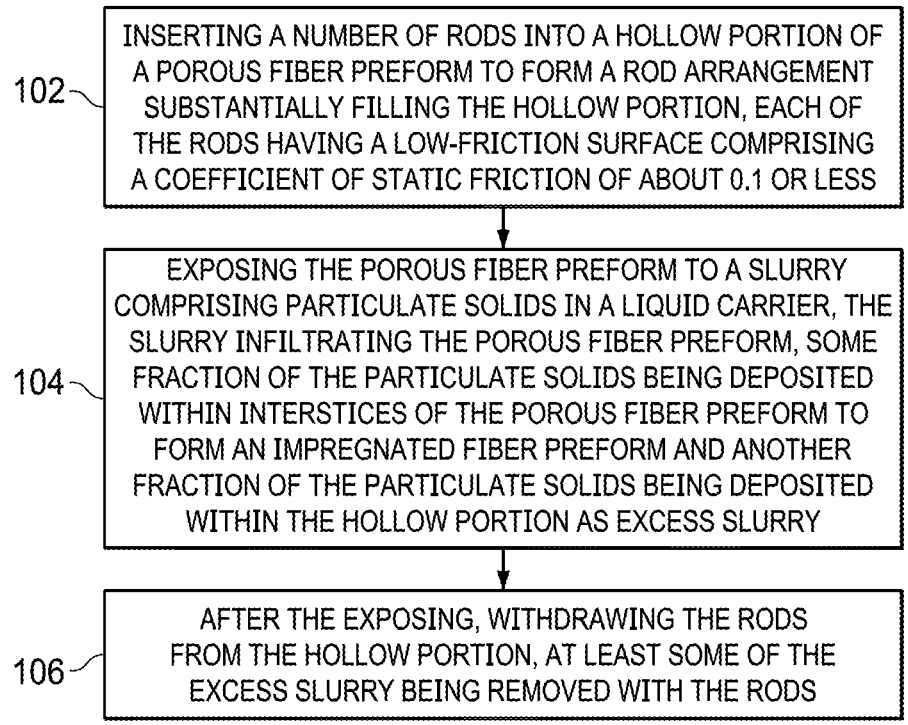
FIG. 1 shows a flow chart of the method.
Figure 2:
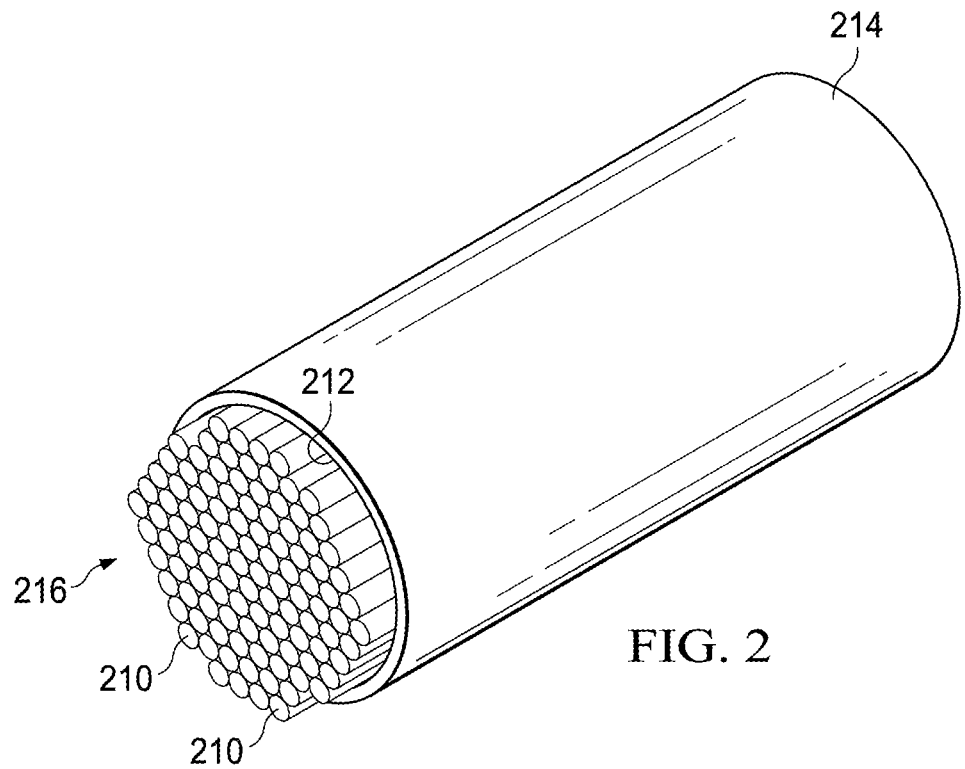
FIG. 2 is a schematic of a number of rods inserted into a hollow portion of an exemplary porous fiber preform that has not yet undergone slurry infiltration. Each rod in the hollow portion has a low-friction surface.

Referring to FIG. 1, the method entails, prior to slurry infiltration, inserting 102 a number of rods 210 into a hollow portion 212 of a porous fiber preform 214 to form a rod arrangement 216 that substantially fills the hollow portion 212, as illustrated in FIG. 2. In this example, the hollow portion 212 has a tubular shape, although the method may be effective with other geometries also. Each of the rods 210 has a low-friction surface comprising a coefficient of static friction of about 0.1 or less. In one example, the low-friction surface may comprise polytetrafluoroethylene (PTFE), acetal homopolymer, Nylon, ultrahigh molecular weight polyethylene (UHMW-PE) or another material having a low coefficient of friction. Polymers work well as a rod material as they tend to be flexible, which facilitates insertion of the rods into hollow portions of complex shapes.

After insertion of the rods 210, the porous fiber preform 214 is exposed 104 to a slurry for infiltration ("slurry infiltration"). The slurry includes particulate solids in a liquid carrier, such as a solvent or water, and may contain a preceramic polymer. The particulate solids may comprise ceramic particles and optionally reactive elements. To expose the porous fiber preform to the slurry, the porous fiber preform may be partially or fully immersed in the slurry. Consequently, the slurry infiltrates the porous fiber preform. In other words, in a process that is generally understood to be driven by capillary forces, the slurry penetrates interstices of the porous fiber preform. The slurry may also penetrate interstices of the rod arrangement within the hollow portion.

During slurry infiltration, some fraction of the particulate solids may be deposited within the interstices of the porous fiber preform, thereby forming an impregnated fiber preform, as intended. Another fraction of the particulate solids may be deposited within the hollow portion (e.g., within interstices and on surfaces of the rod arrangement) as excess slurry that is preferably removed after infiltration. An additional fraction of the slurry may be deposited on outer surfaces of the porous fiber preform, also as excess slurry. The excess slurry may contain some amount of residual carrier liquid in addition to the particulate solids.

After exposure of the porous fiber preform to the slurry and the concomitant slurry infiltration process, the rods are withdrawn 106 from the hollow portion, for example, by pulling out or pushing out of the preform. Due to the low-friction surface of the rods, they may be manually or automatically withdrawn from the cavity without application of a substantial tensile or compressive force. As the rods are withdrawn from the hollow portion, at least some and possibly all of the excess slurry is removed. Because the rod arrangement provides multiple pathways for slurry infiltration, a significant fraction of the excess slurry deposited within the hollow portion may be lodged in the interstices of the rod arrangement and readily removed as the rods are withdrawn. Furthermore, since the rods take up a significant volume of the hollow portion, the amount of excess slurry that can accumulate in the hollow portion may be significantly decreased compared to conventional slurry infiltration processes. Once the rods are withdrawn, any excess slurry remaining in the hollow portion may be removed by cleaning processes known in the art, such as using small scraper rods and bottle or pipe brushes. In addition, any excess slurry on the outer surfaces of the fiber preform may also be removed (e.g., by brushing).

In order to completely fill the hollow portion during rod insertion, the number of rods inserted into the hollow portion should be such that an additional rod having the same diameter as the inserted rods, or a diameter comparable to an average diameter of the inserted rods (for inserted rods of varying diameters), cannot be inserted due to insufficient space. The hollow portion may be considered to be "substantially filled" when the number of rods inserted is at least about 90% of the number required to completely fill the hollow portion, or at least about 95% of this number.

A critical aspect of the process is that more than one rod is inserted into the hollow portion prior to slurry infiltration. If only a single rod is used, the number of pathways for infiltration in the hollow portion is drastically decreased, and infiltration occurs only in available space between the surface of the rod and the wall(s) of the hollow portion. Since excess slurry may build up around much or all of the surface of the rod during infiltration, the single rod may become locked in place as the slurry dries. Experiments carried out with a single customized rod having surface protrusions designed to hold the rod away from the wall of the hollow portion during infiltration show this result; after infiltration, the customized rod remains locked in place and cannot be removed without excessive force or damage to the fiber preform.

The number of rods that may be inserted into the hollow portion depends on the size of the rods as well as the size of the hollow portion, and thus may vary over a wide range. For example, the number (n) may range from 2 to 10,000 and more typically lies between 10 and 1,000, where it is assumed each rod has a diameter $d_i$. The diameters $d_i$ may be the same (e.g., $d_1=d_2=\ldots=d_n$), or they may be different, where at least one of the rods has a diameter different from (smaller or larger than) one or more of the other rods (e.g., $d_i \neq d_j$). An average diameter d of the rods may thus be defined as $d=\Sigma_{i=1}^{n} d_i/n$. The hollow portion may have a width or diameter D, which may be a nominal or average value depending on the geometry of the hollow portion. The method may be carried out most effectively when a ratio d/D is no greater than about 0.5, and the ratio d/D may lie in a range from about 0.02 to about 0.5. Typically the ratio d/D lies between about 0.05 and 0.4.

To facilitate withdrawal of the rods after infiltration, it may be beneficial for each of the rods to have a length $l_i$ at least as long as a length L of the hollow portion. Preferably, the lengths $l_i$ are greater than the length of the hollow portion. In such a case, an end of each rod may protrude from the hollow portion and enable easy access to and removal of the rods after slurry infiltration. As noted above, suitable rods have a low-friction surface, such as a PTFE surface. The rods may be fabricated entirely from a low-friction material, such as PTFE or another polymer. PTFE rods are commercially available from several sources.

The hollow portion may take the form of an internal cavity within or a passageway through the fiber preform that includes at least one opening to permit insertion and removal of the rods. In the example of FIG. 2, the hollow portion 212 comprises a tubular shape with two openings, but any hollow three-dimensional shape is possible. Also, the hollow portion 212 need not be straight, as shown in the example of FIG. 2, but instead may include one or more curves along a length thereof. In such a case, it is preferred that each rod has sufficient stiffness to resist buckling during insertion while having sufficient flexibility to navigate the one or more curves. Depending on the geometry of the hollow portion, it may be advantageous to employ rods having a non-constant diameter d, such as if the hollow portion has a conical shape.

A vacuum may be applied to the porous fiber preform prior to exposure to the slurry and then removed during infiltration to create a pressure gradient (e.g., about 1 atm) that may enhance the capillary forces. The porous fiber preform may be exposed to the slurry at room temperature (e.g., from about 15° C. to about 25° C.). After exposure to the slurry and infiltration, the impregnated fiber preform may be dried to remove some or all of the solvent. Drying may be carried out at room temperature or at an elevated temperature (e.g., from about 40° C. to about 150° C.).

The ceramic fibers that serve as the framework of the porous fiber preform typically comprise silicon carbide, but may also or alternatively comprise another ceramic, such as silicon nitride, alumina, aluminosilicate, or carbon. The particulate solids may comprise ceramic particles that become part of the ceramic matrix after melt infiltration. Typically, these ceramic particles comprise silicon carbide, but they may also or alternatively include silicon nitride, alumina, aluminosilicate, and/or boron carbide or another refractory carbide. In a preferred embodiment, the ceramic fibers comprise silicon carbide, and the ceramic particles (and ultimately the ceramic matrix) also comprise silicon carbide. The ceramic matrix composite that is formed in this case may be referred to as a silicon carbide/silicon carbide or SiC/SiC composite. As used herein, the term "silicon carbide" refers broadly to the compound SiC as well as to other silicon-containing carbides. The solvent in which the particulate solids are suspended may be an aqueous or organic solvent, such as water, ethanol, methanol, isopropyl alcohol, methyl ethyl ketone, or toluene. The slurry may further include a binder, such as polyethylene glycol, an acrylate co-polymer, a latex co-polymer, and/or polyvinyl butyral, a dispersant, such as ammonium polyacrylate, polyvinyl butyral, a phosphate ester, polyethylene imine, and/or BYK® 110 (Byk USA, Wallingford, Conn.), and/or other slurry additives (e.g., reactive elements such as carbon or refractory metals) in an amount of about 10 wt. % or less, or about 5 wt. % or less.

Prior to inserting the rods into the hollow portion, the porous fiber preform may be fabricated using ceramic matrix composite processing methods known in the art. A woven or nonwoven fiber assembly may be formed by lay-up of a plurality of ceramic fibers. The ceramic fibers may be coated with an interphase coating (e.g., comprising pyrolytic carbon or boron nitride (BN)) before or after the fiber assembly is formed. The interphase coating may serve as an interface between the ceramic fibers and the melt (e.g., molten silicon) during melt infiltration and also as a compliant layer to enhance toughness and crack deflection in the final densified composite. The fiber assembly may then be rigidized by applying a ceramic coating thereto using a process such as chemical vapor infiltration. Using any or all of the above-mentioned steps, a porous fiber preform that includes a hollow portion may be formed. After slurry infiltration and withdrawal of the rods from the hollow portion, as well as removal of any excess slurry, the impregnated fiber preform may be infiltrated with a melt (e.g., a silicon or silicon alloy) to form, upon cooling and solidification, a densified ceramic matrix composite (CMC), The CMC, fabricated as described herein, may form part or all of a nozzle guide vane or blade, a seal segment, or another gas turbine engine component that may have an internal cavity or bore.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method of slurry infiltration and cleaning to fabricate a ceramic matrix composite (CMC) component with an internal cavity or bore, the method comprising:
    inserting a number of rods into a hollow portion of a porous fiber preform to form a rod arrangement substantially filling the hollow portion, each of the rods comprising a polymer and having a low-friction surface comprising a coefficient of static friction of 0.1 or less;
    exposing the porous fiber preform to a slurry comprising particulate solids in a liquid carrier, the slurry infiltrating the porous fiber preform, some fraction of the particulate solids being deposited within interstices of the porous fiber preform to form an impregnated fiber preform and another fraction of the particulate solids being deposited within the hollow portion as excess slurry; and
    after the exposing, withdrawing the rods from the hollow portion, at least some of the excess slurry being removed with the rods.

2. The method of claim 1, wherein exposing the porous fiber preform to the slurry comprises partially or fully immersing the porous fiber preform in the slurry.

3. The method of claim 1, wherein withdrawing the rods comprises pulling the rods out of the hollow portion.

4. The method of claim 1, wherein withdrawing the rods comprises pushing the rods out of the hollow portion.

5. The method of claim 1, wherein not all of the excess slurry is removed with the rods, and
    further comprising, after the withdrawing, removing any remaining excess slurry from the hollow portion.

6. The method of claim 1, wherein an additional fraction of the slurry is deposited on outer surfaces of the porous fiber preform as excess slurry, and further comprising removing the excess slurry from the outer surfaces.

7. The method of claim 6, wherein removing the excess slurry from the outer surfaces of the fiber preform comprises brushing the outer surfaces.

8. The method of claim 1, wherein the low-friction surface of each of the rods comprises polytetrafluoroethylene (PTFE).

9. The method of claim 1, wherein the liquid carrier comprises a solvent or water.

10. The method of claim 9, wherein the solvent comprises water and wherein the particulate solids include silicon carbide particles.

11. The method of claim 1, wherein the rods have an average diameter d and the hollow portion has a width or diameter D, and wherein a ratio d/D is no greater than 0.5.

12. The method of claim 11, wherein each rod has the same diameter.

13. The method of claim 11, wherein at least one of the rods has a different diameter.

14. The method of claim 1, wherein each of the rods has a length li at least as long as a length L of the hollow portion.

15. The method of claim 1, wherein the preform includes more than one opening to the hollow portion.

16. The method of claim 1, wherein the hollow portion comprises a tubular shape.

17. The method of claim 1, wherein the hollow portion includes one or more curves along a length thereof.

18. The method of claim 17, wherein each rod has sufficient stiffness to resist buckling during insertion while having sufficient flexibility to navigate the one or more curves.

19. The method of claim 1, wherein each of the rods has a non-constant diameter d along a length thereof.

20. The method of claim 1, further comprising, after withdrawal of the rods and removal of the excess slurry:
    infiltrating the impregnated fiber preform with a melt; and
    forming, upon solidification of the melt, a ceramic matrix composite.

* * * * *